US012798227B2

(12) United States Patent
Kim et al.

(10) Patent No.: US 12,798,227 B2
(45) Date of Patent: Nov. 17, 2026

(54) WINDOW MANUFACTURING APPARATUS, WINDOW MANUFACTURING METHOD, AND MANUFACTURING METHOD OF DISPLAY DEVICE

(71) Applicant: SAMSUNG DISPLAY CO., LTD., Yongin-si (KR)

(72) Inventors: Kitaek Kim, Cheonan-si (KR); Jungsuk Koo, Asan-si (KR); Yongwoon Byun, Asan-si (KR); Leegu Han, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 121 days.

(21) Appl. No.: 18/439,636

(22) Filed: Feb. 12, 2024

(65) Prior Publication Data

US 2024/0181767 A1 Jun. 6, 2024

Related U.S. Application Data

(62) Division of application No. 17/451,295, filed on Oct. 18, 2021, now Pat. No. 11,897,243.

(30) Foreign Application Priority Data

Mar. 5, 2021 (KR) ........................ 10-2021-0029132

(51) Int. Cl.
*B32B 38/18* (2006.01)
*B32B 7/12* (2006.01)
(Continued)

(52) U.S. Cl.
CPC ............ *B32B 38/1858* (2013.01); *B32B 7/12* (2013.01); *B32B 17/10779* (2013.01);
(Continued)

(58) Field of Classification Search
CPC ........................ B32B 37/0046; B32B 38/1858
See application file for complete search history.

(56) References Cited

U.S. PATENT DOCUMENTS 7,686,052 B2 * 3/2010 Song .................... B41J 11/0085 269/21
9,594,268 B2 3/2017 Oh et al.
(Continued)

FOREIGN PATENT DOCUMENTS

CN 109483866 A 3/2019
CN 218315219 U 1/2023
(Continued)

OTHER PUBLICATIONS

Chinese Office Action issued in corresponding Patent Application No. KR 202210206061.8, mailed Feb. 15, 2026, 8 pages.
(Continued)

*Primary Examiner* — Philip C Tucker
*Assistant Examiner* — John Blades
(74) *Attorney, Agent, or Firm* — Womble Bond Dickinson (US) LLP

(57) ABSTRACT

A window manufacturing apparatus includes a transporting table on which a target substrate is to be mounted, the transporting table including a first portion and a second portion having a greater thickness than the first portion, a plurality of suctioning ports on a suctioning table, the plurality of suctioning ports being configured to suction the target substrate, and an attachment device configured to attach a protective film to the target substrate suctioned to the suctioning table. In a state in which the target substrate mounted on the transporting table is suctioned to the suctioning table, the plurality of suctioning ports overlap the second portion of the transporting table and do not overlap the first portion of the transporting table in a plan view.

9 Claims, 10 Drawing Sheets

(51) Int. Cl.

| | |
|---|---|
| ***B32B 17/10*** | (2006.01) |
| ***B32B 37/00*** | (2006.01) |
| ***B32B 37/12*** | (2006.01) |

(52) U.S. Cl.

CPC .......... *B32B 37/0046* (2013.01); *B32B 37/12* (2013.01); *B32B 2457/20* (2013.01)

(56) References Cited

U.S. PATENT DOCUMENTS

| | | | | |
|---|---|---|---|---|
| 11,457,536 | B2 | 9/2022 | Shin et al. | |
| 11,897,243 | B2 | 2/2024 | Kim et al. | |
| 12,343,971 | B2 | 7/2025 | Shin et al. | |
| 2003/0145943 | A1* | 8/2003 | Lee | G02F 1/1341 156/382 |
| 2013/0312907 | A1* | 11/2013 | Oh | B32B 38/1858 156/382 |
| 2014/0345805 | A1 | 11/2014 | Maeda et al. | |
| 2015/0367618 | A1 | 12/2015 | Kameda et al. | |
| 2018/0086034 | A1* | 3/2018 | Lee | B41M 7/0027 |
| 2018/0158796 | A1 | 6/2018 | Otsuka et al. | |

FOREIGN PATENT DOCUMENTS

| | | | |
|---|---|---|---|
| JP | 2007-090322 | A | 4/2007 |
| KR | 10-1126685 | B1 | 3/2012 |
| KR | 10-1684344 | B1 | 12/2016 |
| KR | 10-1790226 | B1 | 10/2017 |
| KR | 10-2018-0062948 | A | 6/2018 |
| KR | 10-2020-0037017 | A | 4/2020 |
| KR | 10-2020-0059370 | A | 5/2020 |
| KR | 10-2134270 | B1 | 7/2020 |
| KR | 10-2021-0010029 | A | 1/2021 |

OTHER PUBLICATIONS

Korean Notice of Allowance issued in corresponding KR Application No. 10-2021-0029132 A, dated Sep. 14, 2026, 9 pages.

* cited by examiner

WINDOW MANUFACTURING APPARATUS, WINDOW MANUFACTURING METHOD, AND MANUFACTURING METHOD OF DISPLAY DEVICE

CROSS-REFERENCE TO RELATED APPLICATIONS

This application is a divisional of U.S. patent application Ser. No. 17/451,295, filed Oct. 18, 2021, which claims priority to and the benefit of Korean Patent Application No. 10-2021-0029132, filed Mar. 5, 2021, the entire content of both of which is incorporated herein by reference.

BACKGROUND

1. Field

The present disclosure relates to a window manufacturing apparatus and a window manufacturing method for manufacturing a window with improved folding reliability, and a manufacturing method of a display device including the window.

2. Description of the Related Art

A display device may provide a user with information by displaying various images on a display screen. Typically, a display device displays information within an assigned screen. Flexible display devices including a foldable flexible display panel are being developed. A flexible display device is foldable, rollable, or bendable unlike a rigid display device. The flexible display device of which the shape may be variously changed may be carried regardless of the screen size, so that user convenience may be improved.

SUMMARY

Aspects of one or more embodiments of the present disclosure are directed toward a window manufacturing apparatus and a window manufacturing method for manufacturing a window with improved folding reliability and durability.

Aspects of one or more embodiments of the present disclosure are directed toward a manufacturing method of a display device including a window with improved reliability and durability.

An embodiment of the present disclosure provides a window manufacturing apparatus including: a transporting table on which a target substrate is to be mounted, the transporting table including a first portion and a second portion having a greater thickness than the first portion; a plurality of suctioning ports on a suctioning table, the plurality of suctioning ports being configured to suction the target substrate; and an attachment device configured to attach a protective film to the target substrate suctioned to the suctioning table. In a state in which the target substrate mounted on the transporting table is suctioned to the suctioning table, the plurality of suctioning ports overlap the second portion of the transporting table and do not overlap the first portion of the transporting table in a plan view.

In an embodiment, the target substrate may include a folding portion, and a non-folding portion adjacent to the folding portion, and, in a state in which the target substrate is mounted on the transporting table, the folding portion may overlap the first portion, and the non-folding portion may overlap the second portion.

In an embodiment, in a state in which the target substrate is suctioned to the suctioning table, the plurality of suctioning ports may overlap the non-folding portion.

In an embodiment, the target substrate may include glass.

In an embodiment, in the state in which the target substrate is mounted on the transporting table, the target substrate may contact an upper surface of the second portion, and may not contact an upper surface of the first portion.

In an embodiment, in a state in which the target substrate is suctioned to the suctioning table, the target substrate may contact a lower surface of the suctioning table.

In an embodiment, the lower surface of the suctioning table has a surface roughness of about 10 μm to about 50 μm.

In an embodiment, the window manufacturing apparatus may further include a transporting device configured to transport the target substrate to the transporting table and to mount the target substrate on a mounting surface of the transporting table.

In an embodiment, the transporting table may include a first transporting table configured to receive the target substrate from the transporting device, and a second transporting table configured to rotate the target substrate mounted on the first transporting table.

In an embodiment, the protective film comprises polyethylene terephthalate (PET).

In an embodiment, the window manufacturing apparatus may further include a flexure evaluating device measuring the flexural strength of the target substrate to which the protective film is attached.

An embodiment of the present disclosure provides a window manufacturing method including: mounting a target substrate on a transporting table including a first portion and a second portion having a greater thickness than the first portion; suctioning the target substrate mounted on the transporting table through a plurality of suctioning ports of a suctioning table; and attaching a protective film to the target substrate suctioned to the suctioning table. In the suctioning of the target substrate to the suctioning table, the plurality of suctioning ports overlap the second portion of the transporting table and do not overlap the first portion of the transporting table in a plan view.

In an embodiment, the target substrate may include a folding portion and a non-folding portion adjacent to the folding portion, and, in the mounting of the target substrate on the transporting table, the folding portion may overlap the first portion, and the non-folding portion may overlap the second portion.

In an embodiment, in the suctioning of the target substrate to the suctioning table, the plurality of suctioning ports may overlap the non-folding portion.

In an embodiment, in the mounting of the target substrate on the transporting table, the target substrate may contact an upper surface of the second portion, and may not contact an upper surface of the first portion.

In an embodiment, the target substrate may include ultra-thin glass (UTG).

In an embodiment, the protective film may include polyethylene terephthalate (PET).

An embodiment of the present disclosure provides a manufacturing method of a display device, the method including: preparing a window including a first non-folding region, a folding region, and a second non-folding region which are sequentially arranged in a first direction; preparing a display module; and combining the window and the display module. The preparing of the window includes: mounting a target substrate on a transporting table including a first portion and a second portion having a greater thickness than the first portion; suctioning the target substrate mounted on the transporting table through a plurality of suctioning ports of a suctioning table; and attaching a protective film to the target substrate suctioned to the suctioning table. In the suctioning of the target substrate to the suctioning table, the plurality of suctioning ports overlap the second portion of the transporting table and do not overlap the first portion of the transporting table in a plan view.

In an embodiment, the target substrate includes a folding portion overlapping the folding region, and a non-folding portion overlapping the first non-folding region and the second non-folding region, and, in the mounting of the target substrate on the transporting table, the folding portion may overlap the first portion, and the non-folding portion may overlap the second portion.

In an embodiment, in the suctioning of the target substrate to the suctioning table, the plurality of suctioning ports may overlap the non-folding portion.

BRIEF DESCRIPTION OF THE FIGURES

The accompanying drawings are included to provide a further understanding of the present disclosure, and are incorporated in and constitute a part of this specification. The drawings illustrate embodiments of the present disclosure and, together with the description, serve to explain principles of the present disclosure. In the drawings.

DETAILED DESCRIPTION

Figure 1A:
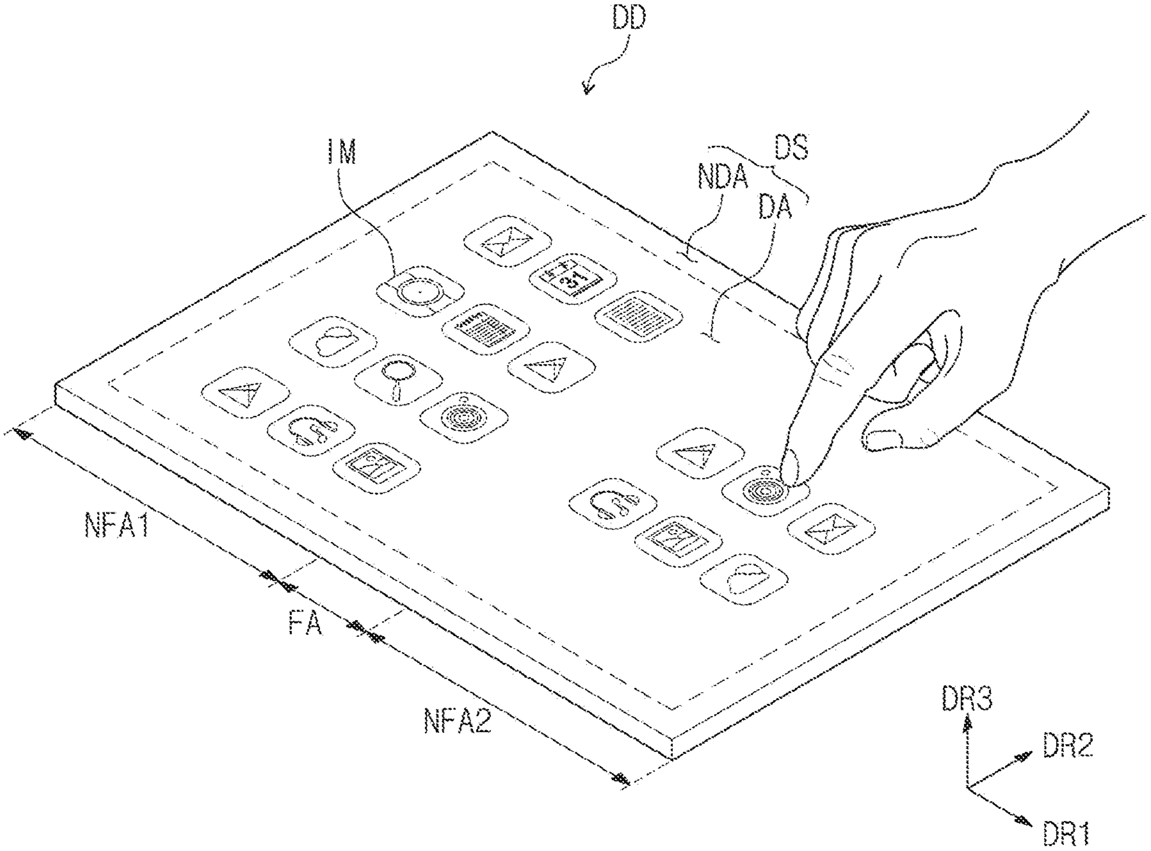
FIG. 1A is a perspective view of a display device according to an embodiment of the present disclosure.

The present disclosure will now be described more fully with reference to the accompanying drawings in which embodiments of the disclosure are shown.

The terminology used herein is for the purpose of describing particular embodiments only and is not intended to limit the embodiments described herein.

Further, the use of “may” when describing embodiments of the present disclosure refers to “one or more embodiments of the present disclosure”.

In this specification, when a component (or region, layer, portion, etc.) is referred to as “on”, “connected”, or “coupled” to another component, it may be directly on, connected, or coupled to the other element or one or more intervening elements may also be present. When an element is referred to as being “directly on,” “directly connected to,” or “directly coupled to” another element, there are no intervening elements present.

The same reference numerals refer to the same or substantially the same elements throughout, and duplicative descriptions thereof may not be provided. In addition, in the drawings, thicknesses, ratios, and dimensions of components may be exaggerated for clarity.

As used herein, the term “and/or” includes any and all combinations of one or more of the associated listed items.

Terms such as first and second may be used to describe various components, but the components should not be limited by these terms. These terms are only used for the purpose of distinguishing one component from other components. For example, without departing from the scope of the present disclosure, a first component may be referred to as a second component, and similarly, a second component may be referred to as a first component. Singular expressions include plural expressions unless the context clearly indicates otherwise.

In addition, spatially relative terms such as “below”, “lower”, “above”, and “upper” are used to describe the relationship between components shown in the drawings. The terms are relative concepts and are described based on the directions indicated in the drawings. It will be understood that the spatially relative terms are intended to encompass different orientations of the device in use or operation in addition to the orientation depicted in the drawings. For example, if the device in the drawings is turned over, elements described as “below” other elements or features would then be oriented “above” the other elements or features. Thus, the term “below” may encompass both an orientation of above and below. The device may be otherwise oriented (rotated 90 degrees or at other orientations), and the spatially relative descriptors used herein should be interpreted accordingly.

As used herein, the terms “substantially,” “about,” and similar terms are used as terms of approximation and not as terms of degree, and are intended to account for the inherent deviations in measured or calculated values that would be recognized by those of ordinary skill in the art. “About” or “approximately,” as used herein, is inclusive of the stated value and refers to within an acceptable range of deviation for the particular value as determined by one of ordinary skill in the art, considering the measurement in question and the error associated with measurement of the particular quantity (i.e., the limitations of the measurement system). For example, “about” may refer to within one or more standard deviations, or within ±30%, 20%, 10%, 5% of the stated value.

Any numerical range recited herein is intended to include all sub-ranges of the same numerical precision subsumed within the recited range. For example, a range of “1.0 to 10.0” is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Unless otherwise defined, all terms (including technical and scientific terms) used herein have the same meaning as commonly understood by one of ordinary skill in the art to which this disclosure pertains. In addition, terms such as terms defined in commonly used dictionaries should be interpreted as having a meaning consistent with the meaning in the context of the related technology, and unless interpreted as an ideal or excessively formal meaning, should be explicitly defined herein.

Terms such as "include" or "have" are intended to designate the presence of a feature, number, step, action, component, part, or combination thereof described in the specification, and it should be understood that it does not preclude the possibility of presence or addition of one or more other features, numbers, steps, operations, components, parts, or combinations thereof.

Hereinafter, embodiments of the present disclosure will be described with reference to the accompanying drawings.

Figure 1B:
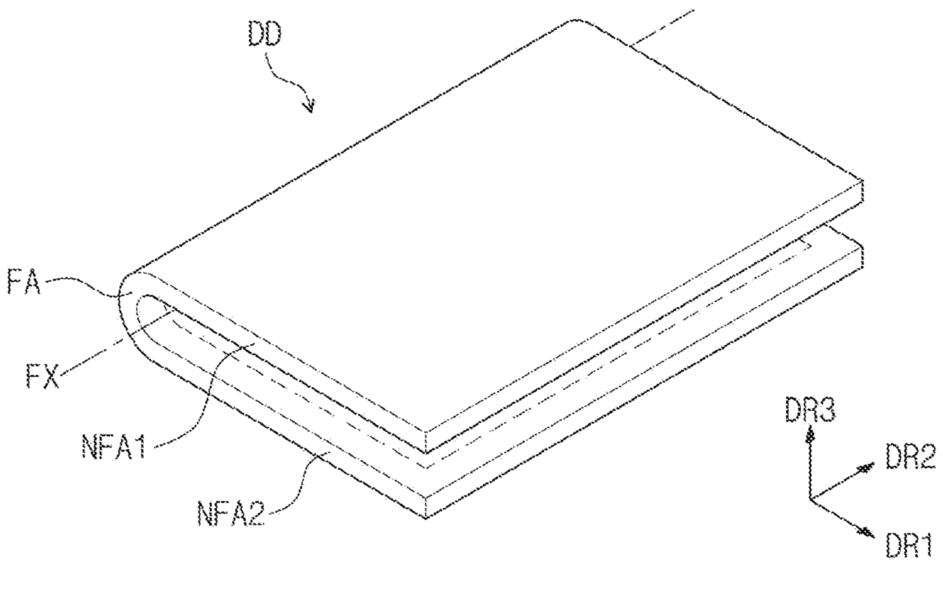
FIG. 1B is a diagram illustrating a folded state of a display device illustrated in FIG. 1A.

FIG. 1A is a perspective view of a display device according to an embodiment of the present disclosure. FIG. 1B is a diagram illustrating a folded state of a display device illustrated in FIG. 1A.

Referring to FIGS. 1A and 1B, a display device DD may be a foldable display device. The display device DD according to the present disclosure may be used in large electronic devices such as televisions and/or monitors, as well as small-sized and medium-sized electronic devices such as mobile phones, tablets, car navigation systems, game consoles, and/or smart watches.

An upper surface of the display device DD may be defined as a display surface DS, and the display surface DS may have a plane defined by a first direction DR1 and a second direction DR2 while the display device DD is unfolded. A third direction DR3 is a direction crossing the first direction DR1 and the second direction DR2, and may be defined as a thickness direction of the display device DD. A front surface (or an upper surface) and a rear surface (or a lower surface) of the members constituting the display device DD may be defined along the third direction DR3.

The display surface DS may include a display region DA, and a non-display region NDA around the display region DA. The display region DA is a region in which images IM are displayed, and the non-display region NDA is a region in which images IM are not displayed. In FIG. 1A, application icons are illustrated as an example of images IM.

The display region DA may have a rectangular shape. The non-display region NDA may surround the display region DA. However, the present disclosure is not limited thereto, and the shape of the display region DA and the shape of the non-display region NDA may be any suitable shape (e.g., the shape of the display region DA and the shape of the non-display region NDA may be designed to correspond to each other).

A first non-folding region NFA1, a folding region FA, and a second non-folding region NFA2 may be defined (e.g., sequentially defined) along the first direction DR1 in the display device DD. For example, the folding region FA may be defined between the first non-folding region NFA1 and the second non-folding region NFA2. In FIGS. 1A and 1B, one folding region (e.g., the folding region FA), and two non-folding regions (e.g., the first and second non-folding regions NFA1 and NFA2) are illustrated, but the number of folding regions and the number of non-folding regions are not limited thereto. For example, the display device DD may include more than two non-folding regions (e.g., a plurality of non-folding regions including at least three non-folding regions), and more than one folding region (e.g., a plurality of folding regions) disposed between the plurality of non-folding regions.

The display device DD may be folded with respect to a folding axis FX. That is, the folding region FA may be bent with respect to or around the folding axis FX. The folding axis FX may extend along the second direction DR2. The folding axis FX may be defined as an axis parallel to a short side of the display device DD.

When the display device DD is folded, the display surface of the first non-folding region NFA1 and the display surface of the second non-folding region NFA2 may face each other. Accordingly, the display surface DS may not be exposed to the outside in a folded state. In an embodiment of the present disclosure, the rear surface of the display device DD may be provided with a rear surface display region. In this case, when the display device DD is folded, the rear surface display region may be exposed to the outside, which may be referred to as 'in-folding'. However, this is a non-limiting example, and an operation of the display device DD is not limited thereto.

For example, in an embodiment of the present disclosure, when the display device DD is folded, the first non-folding region NFA1 and the second non-folding region NFA2 may face away from each other or be opposed to each other. Accordingly, in the folded state, the display region DA may be exposed to the outside, which may be referred to as 'out-folding'.

The display device DD may be capable of performing any one operation of in-folding or out-folding. Alternatively, the display device DD may be capable of performing both in-folding and out-folding operations. In this case, the same region of the display device DD, for example, the folding region FA may be in-folded and out-folded. Alternatively, some region of the display device DD may be in-folded, and the other region of the display device DD may be out-folded.

Figure 2A:
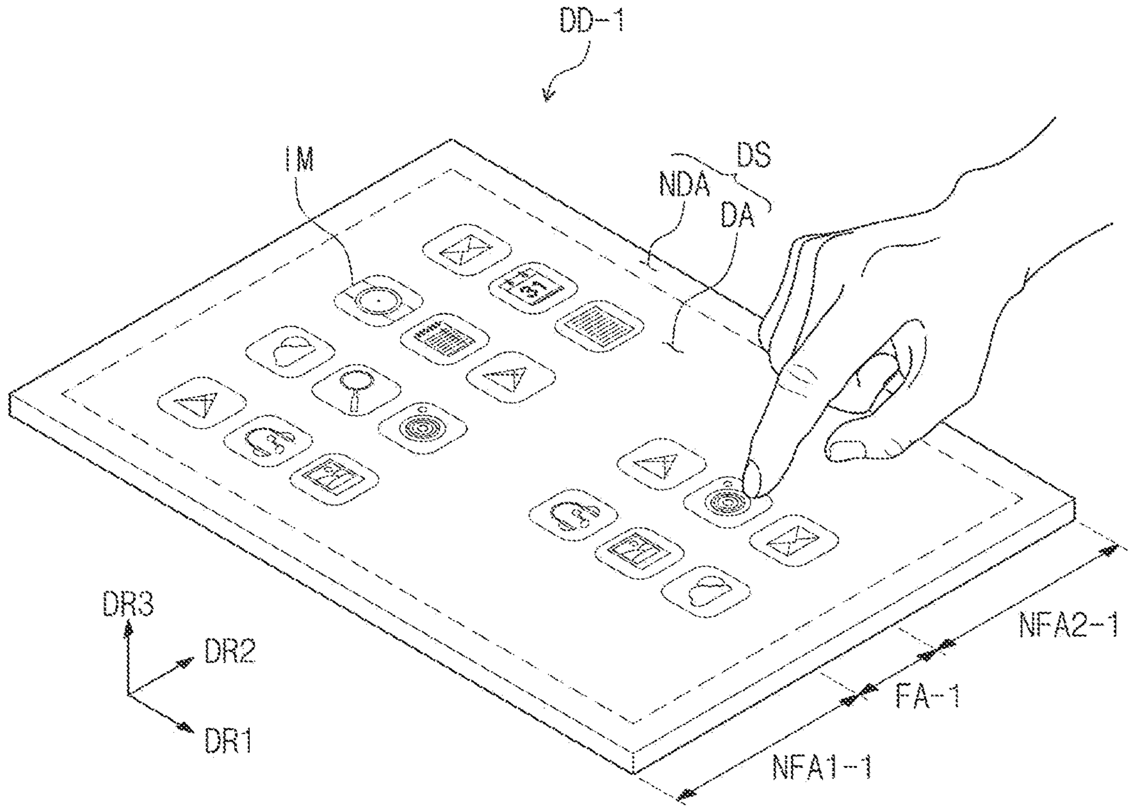
FIG. 2A is a perspective view of a display device according to an embodiment of the present disclosure.
Figure 2B:
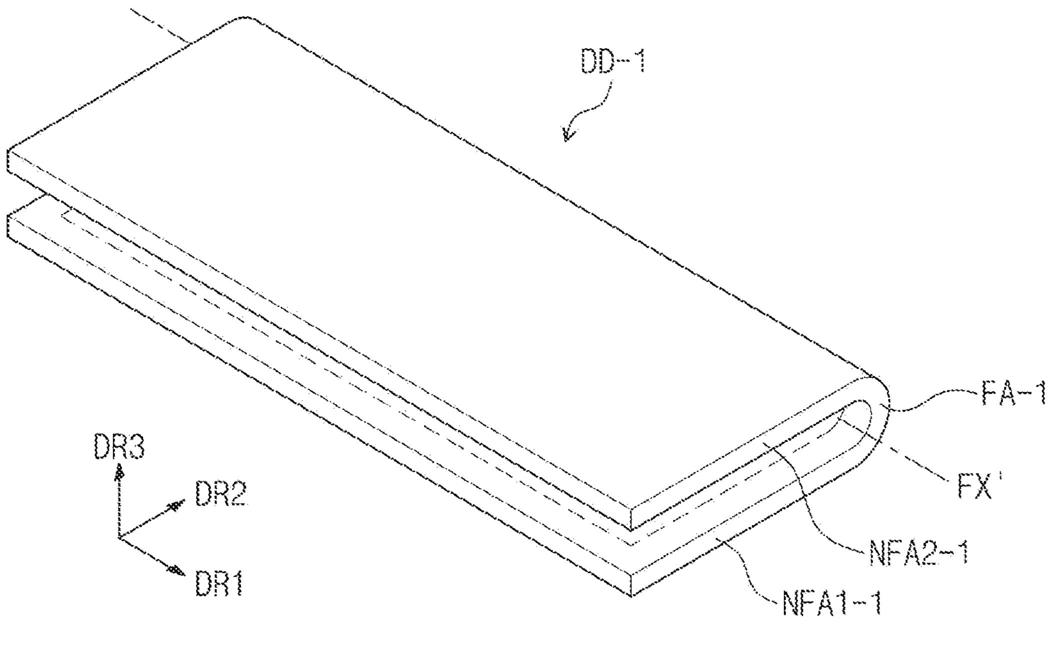
FIG. 2B is a diagram illustrating a folded state of a display device illustrated in FIG. 2A.

FIG. 2A is a perspective view of a display device according to an embodiment of the present disclosure. FIG. 2B is a diagram illustrating a folded state of a display device illustrated in FIG. 2A.

Referring to FIGS. 2A and 2B, a first non-folding region NFA1-1, a folding region FA-1, and a second non-folding region NFA2-1 may be defined (e.g., sequentially defined) along a second direction DR2 in a display device DD-1. The folding region FA-1 may be defined between the first non-folding region NFA1-1 and the second non-folding region NFA2-1.

The display device DD-1 may be folded with respect to a folding axis FX'. That is, the folding region FA-1 may be bent with respect to or around the folding axis FX'. The folding axis FX' may extend along the first direction DR1. The folding axis FX' may be defined as an axis parallel to a long side of the display device DD.

Hereinafter, as illustrated in FIGS. 1A and 1B, the structure of the display device DD folded with respect to the folding axis FX parallel to the short side thereof will be described, but the present disclosure is not limited thereto. Structures to be described later, as illustrated in FIGS. 2A and 2B, may be applied to the display device DD-1 folded with respect to the folding axis FX' parallel to the long side thereof.

Figure 3A:
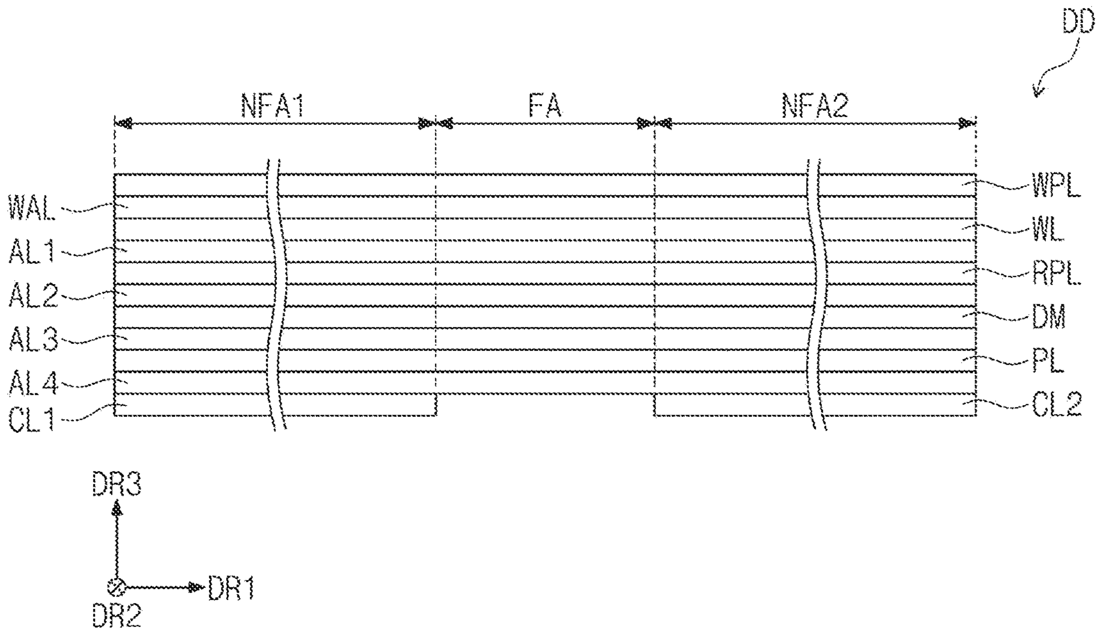
FIG. 3A is a cross-sectional view of a display device according to an embodiment of the present disclosure.
Figure 3B:
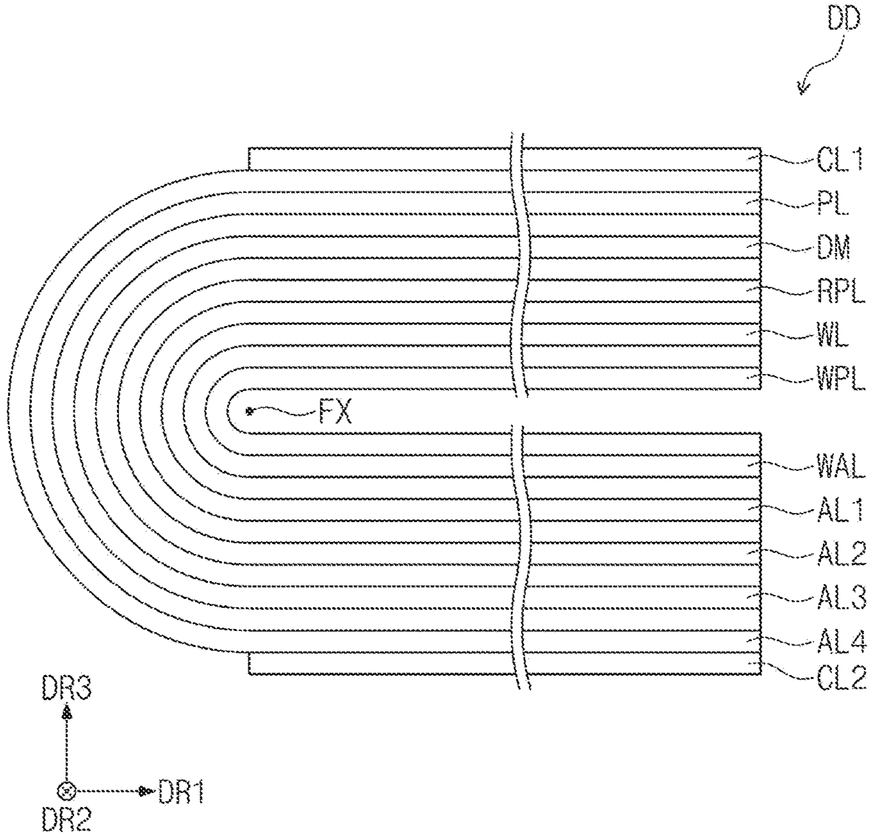
FIG. 3B is a cross-sectional view illustrating a folded state of a display device illustrated in FIG. 3A.

FIG. 3A is a cross-sectional view of a display device according to an embodiment of the present disclosure. FIG. 3B is a cross-sectional view illustrating a folded state of a display device illustrated in FIG. 3A.

Referring to FIGS. 3A and 3B, a display device DD may include a window protective layer WPL, a window base layer WL, an anti-reflective layer RPL, a display module DM, a protective layer PL, a first cover plate CL1 and a second cover plate CL2, and adhesive layers WAL, AL1, AL2, AL3, and AL4.

The display device DD may repeat changing the shape thereof from a first flat state to a second folded state, or changing from the second folded state to the first flat state. The window protective layer WPL, the window base layer WL, the anti-reflective layer RPL, the display module DM, the protective layer PL, and the adhesive layers WAL, AL1, AL2, AL3, and AL4 may have a flexibility. The window protective layer WPL, the window base layer WL, the anti-reflective layer RPL, the display module DM, the protective layer PL, and the adhesive layers WAL, AL1, AL2, AL3, and AL4 may each include a folding region FA. The folding regions of the adhesive layers WAL, AL1, AL2, AL3, and AL4 may overlap each other in a thickness direction of the display device DD. In an embodiment, the display module DM may include the folding region FA. The display module DM may include a first non-folding region NFA1, the folding region FA, and a second non-folding region NFA2 which extend along a first direction DR1.

The window protective layer WPL may be optically transparent. The window protective layer WPL may constitute the outermost surface of the display device DD. An upper surface of the window protective layer WPL may constitute the uppermost surface of the display device DD. That is, in a display device DD of an embodiment, other components (e.g., other components of the display device DD) may not be disposed on the window protective layer WPL (e.g., the upper surface of the window protective layer WPL).

The window protective layer WPL may protect components disposed thereunder. The window protective layer WPL may include a protective film. In addition to the protective film, the window protective layer WPL may be additionally provided with a hard coating layer, an anti-fingerprint layer, etc., on the upper surface and/or a lower surface of the protective layer so as to improve properties such as chemical resistance and/or abrasion resistance.

The window base layer WL may be disposed under the window protective layer WPL. The window base layer WL may be optically transparent. The window protective layer WPL and the window base layer WL may be bonded to each other via a window adhesive layer WAL. The window base layer WL may include an optically transparent insulating material. The window base layer WL may have a multilayer structure, or a single layer structure.

In an embodiment, a hard coating layer may be disposed on an upper surface of the window base layer WL. The hard coating layer is a functional layer for improving the characteristics of use of the display device DD, and may be provided by being applied on the upper surface of the window base layer WL. For example, pollution prevention characteristics, scratch prevention characteristics, impact resistance, etc., may be improved by the hard coating layer. The thickness of the hard coating layer may be about 1 μm to about 5 μm, for example, about 1.5 μm. However, the present disclosure is not limited thereto.

In an embodiment, a shock-absorbing layer may be disposed on a lower surface of the window base layer WL. The shock-absorbing layer may be a functional layer for protecting a display module DM from an external shock. The shock-absorbing layer may be selected from among films having an elastic modulus of about 1 GPa or more at room temperature. The shock-absorbing layer may be a stretchable film including an optical function. For example, the shock-absorbing layer may be an optical axis controlled film. The thickness of the shock-absorbing layer may be about 35 μm to about 45 μm, for example, about 41 μm, but the thickness of the shock-absorbing layer is not limited thereto. In an embodiment of the present disclosure, the shock-absorbing layer may be omitted.

A black matrix may be disposed on one surface of the window base layer WL. The black matrix may be provided by being printed on one surface of the shock-absorbing layer. The black matrix may overlap the non-display region NDA. The black matrix is a colored layer, and may be formed by coating. The black matrix may include a colored organic material, and/or an opaque metal, but a material constituting the black matrix is not limited thereto.

Hereinafter, the window base layer WL, the window protective layer WPL, and the window adhesive layer WAL will be described in more detail in description of FIG. 4.

The anti-reflective layer RPL may be disposed under the window base layer WL. The anti-reflective layer RPL and the window base layer WL may be bonded to each other via a first adhesive layer AL1. The anti-reflective layer RPL may reduce the reflectance of light (e.g., external light) incident from the outside of the display device DD. In an embodiment of the present disclosure, the anti-reflective layer RPL may be omitted, or may be embedded in the display module DM.

The anti-reflective layer RPL according to an embodiment of the present disclosure may include a phase retarder and a polarizer. The phase retarder may be a film type (e.g., a film), or a liquid crystal coating type (e.g., a liquid crystal coating), and may include a λ/2 phase retarder, and/or a λ/4 phase retarder. The polarizer may also be a film type (e.g., a film), and may include a stretchable polymer resin film. The phase retarder and the polarizer may further include a protective film. The phase retarder and the polarizer themselves, or the protective film may be defined as a base layer of the anti-reflective layer RPL.

The anti-reflective layer RPL according to an embodiment of the present disclosure may include color filters. The color filters may have an arrangement (e.g., a predetermined arrangement). The arrangement of the color filters may be determined in consideration of light-emitting colors of pixels included in the display module DM. The anti-reflective layer RPL may further include a black matrix adjacent to the color filters.

The anti-reflective layer RPL according to an embodiment of the present disclosure may include a destructive interference structure. For example, the destructive interference structure may include a first reflective layer and a second reflective layer which are respectively disposed on or at different layers. First reflected light and second reflected light, which are reflected from the first reflective layer and the second reflective layer respectively, may interfere destructively, and thus the reflectance of light (e.g., external light) decreases.

The display module DM may be disposed under the anti-reflective layer RPL. The display module DM and the anti-reflective layer RPL may be bonded to each other via a second adhesive layer AL2. In an embodiment of the present disclosure, the second adhesive layer AL2 may be omitted, and the anti-reflective layer RPL may be disposed directly on the display module DM. The anti-reflective layer RPL may be disposed directly on an input sensing layer ISL (e.g., see FIG. 5) included in the display module DM, and may be a component included in the display module DM. Meanwhile, in the present specification, the statement "component B is disposed directly on component A" refers to no separate adhesive layer and adhesive member being disposed between component A and component B. When component B is disposed directly on component A, component B may be formed through a continuous process on the base surface provided by component A after component A is formed. That is, the anti-reflective layer RPL may be a layer formed on the input sensing layer ISL of the display module DM through a continuous process.

The protective layer PL may be disposed under the display module DM. The protective layer PL and the display module DM may be bonded to each other via a third adhesive layer AL3. The protective layer PL may be a layer for protecting the rear surface of the display module DM.

The protective layer PL may include a polymer film. For example, the protective layer PL may include a polyimide film, a polyamide film, a polyetheretherketone film, or a polyethylene terephthalate film. The thickness of the polymer film included in the protective layer PL may be, for example, about 20 μm to about 50 μm. The polymer film included in the protective layer PL may be a layer having a high modulus so as to protect the display module DM from external impact.

The protective layer PL may include a cushion layer. Then, the protective layer PL may include sponge, foam, a urethane resin, etc. For example, the protective layer PL may include polyurethane foam, or thermoplastic polyurethane foam. Alternatively, the protective layer PL may include acrylonitrile butadiene styrene copolymer (ABS) foam, polyethylene (PE) foam, ethylene vinyl acetate (EVA) foam, polyvinyl chloride (PVC) foam, etc. The protective layer PL may have a structure in which the cushion layer is formed by using the aforementioned polymer film as a base layer. The cushion layer may have a lower modulus and a lower density than the aforementioned polymer film, thereby being capable of absorbing external shock. The thickness of the cushion layer may be about 80 μm to about 120 μm.

The protective layer PL may have a light-absorbing color. For example, the protective layer PL may have a black color. At least one of a polymer film or the cushion layer included in the protective layer PL may have a black material. Accordingly, components disposed under the protective layer PL may be prevented or substantially prevented from being visually recognized from the outside.

A fourth adhesive layer AL4 may be attached under the protective layer PL. The window adhesive layer WAL and the first to fourth adhesive layers (i.e., the first adhesive layer AL1, the second adhesive layer AL2, the third adhesive layer AL3, and the fourth adhesive layer AL4) described above may include a typical bonding agent or adhesive.

A first cover plate CL1 and a second cover plate CL2 may be disposed under the fourth adhesive layer AL4. The first cover plate CL1 may be disposed in a first non-folding region NFA1, and the second cover plate CL2 may be disposed in a second non-folding region NFA2. The first cover plate CL1 and the second cover plate CL2 may be spaced from each other. Because the first cover plate CL1 and the second cover plate CL2 may be spaced from each other, a gap (e.g., a predetermined gap) between the first cover plate CL1 and the second cover plate CL2 may be defined, and the gap (e.g., the predetermined gap) may overlap (e.g., overlap in the thickness direction of the display device DD) the folding region FA. The shape of the display device DD may be more easily deformed by the gap (e.g., the predetermined gap) defined between the first cover plate CL1 and the second cover plate CL2.

The first cover plate CL1 and the second cover plate CL2 may be a metal plate or a plastic plate. For example, the first cover plate CL1 and the second cover plate CL2 may include stainless steel, aluminum, or alloys thereof. For example, the first cover plate CL1 and the second cover plate CL2 may each include SUS304. The strengths of the first cover plate CL1 and the second cover plate CL2 may be greater than that of the display module DM.

In another embodiment of the present disclosure, the first cover plate CL1 and the second cover plate CL2 may each extend to the folding region FA. In this case, the first cover plate CL1 and the second cover plate CL2 may not be attached to the fourth adhesive layer AL4 in the folding region FA. In an embodiment, the first cover plate CL1 and the second cover plate CL2 may be spaced from each other by the folding region FA.

The first cover plate CL1 and the second cover plate CL2 may each include a material having an elastic modulus of about 600 GPa or more at room temperature. The first cover plate CL1 and the second cover plate CL2 may each support components disposed thereon. In addition, the heat dissipation performance of the display device DD may be improved by each of the first cover plate CL1 and the second cover plate CL2.

In an embodiment, the display device DD may further include a cover layer attached under the first cover plate CL1 and the second cover plate CL2. The cover layer may be attached under the first cover plate CL1 and the second cover plate CL2 by using a lower adhesive layer including a typical bonding agent or adhesive. The lower adhesive layer may not overlap the folding region FA. The cover layer may cover a gap (e.g., a predetermined gap) defined between the first cover plate CL1 and the second cover plate CL2, so that foreign matters may be prevented or substantially prevented from entering through the gap (e.g., the predetermined gap).

In an embodiment, the display device DD may further include a lower plate, a heat dissipation sheet, an insulating film, etc., disposed under the first cover plate CL1 and the second cover plate CL2. The display device DD may further include a step compensation member. The display device DD may further include a lower cushion layer disposed under the insulating film, or the step compensation member.

The lower plate may be a component which has a rigidity (e.g., a predetermined rigidity) and prevents or reduces deformation of the shape of components disposed thereon. The lower plate may include a metal alloy.

The heat dissipation sheet may be attached under the lower plate, and may be a thermal conductive sheet having a high thermal conductivity. The display device DD according to an embodiment may include the heat dissipation sheet, thereby easily discharging heat, generated by driving and operating the display device DD, to the outside.

The insulating film may be attached under the heat dissipation sheet. The insulating film may prevent or substantially prevent a rattle in the display device DD from occurring.

The step compensation member may be attached under the first cover plate CL1 and the second cover plate CL2. For example, the cover layer described above may be attached under one portion of the first cover plate CL1 and the second cover plate CL2 by using the lower adhesive layer, and the step compensation member may be attached under the other portion thereof to which the lower adhesive layer is not attached. The step compensation layer may be, for example, a polymer resin film.

Figure 4:
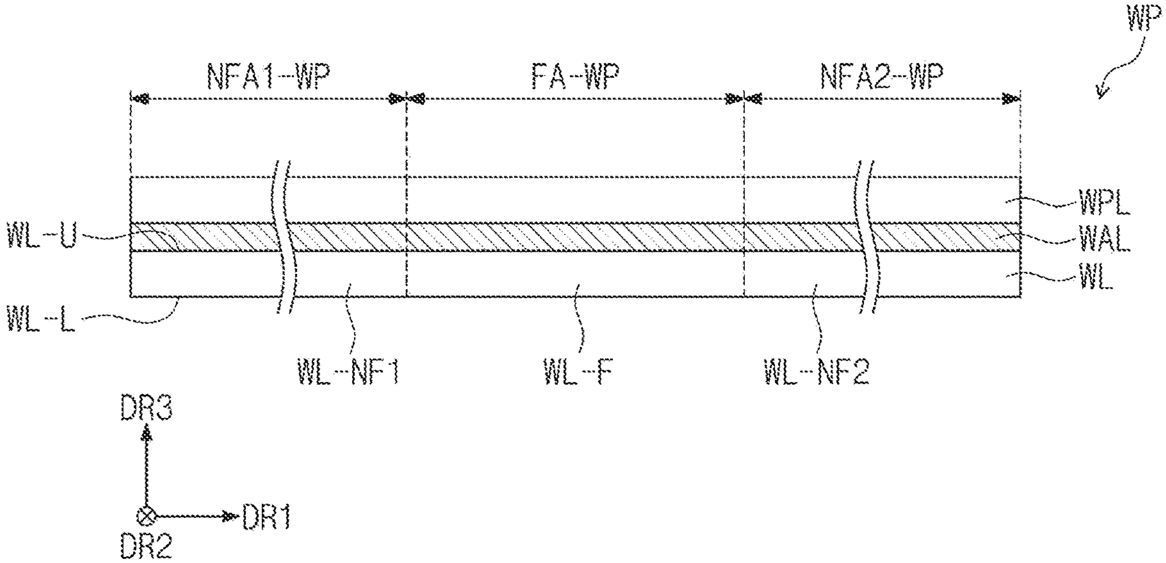
FIG. 4 is a cross-sectional view of a window structure according to an embodiment of the present disclosure.

FIG. 4 is a cross-sectional view of a window according to an embodiment of the present disclosure. The window WP of an embodiment may include a window base layer WL, a window protective layer WPL disposed on the window base layer WL, and a window adhesive layer WAL disposed between the window base layer WL and the window protective layer WPL.

A first non-folding region NFA1-WP, a folding region FA-WP, and a second non-folding region NFA2-WP may be defined (e.g., sequentially defined) along the first direction DR1 in the window WP of an embodiment. The first non-folding region NFA1-WP of the window WP may be a portion overlapping the first non-folding region NFA1 (e.g., see FIG. 3A) of the display device DD (e.g., see FIG. 3A), the folding region FA-WP of the window WP may be a portion overlapping the folding region FA (e.g., see FIG. 3A) of the display device DD (e.g., see FIG. 3A), and the second non-folding region NFA2-WP of the window WP may be a portion overlapping the second non-folding region NFA2 (e.g., see FIG. 3A) of the display device DD (e.g., see FIG. 3A).

Referring to FIG. 4, the window adhesive layer WAL may be disposed between the window protective layer WPL and the window base layer WL, and may contact the lower surface of the window protective layer WPL and the upper surface of the window base layer WL. No other components may be disposed on the lower surface WL-L of the window base layer WL. When the window is applied to the display device DD (e.g., see FIG. 3A), the lower surface WL-L of the window base layer WL may be a surface attached to the anti-reflective layer RPL (e.g., see FIG. 3A) via the first adhesive layer AL1 (e.g., see FIG. 3A).

The window protective layer WPL may be optically transparent. The window protective layer WPL may constitute the outermost surface of the display device DD. The upper surface of the window protective layer WPL may constitute the uppermost surface of the display device DD. That is, in the display device DD of an embodiment, no other components may be disposed on the upper surface of the window protective layer WPL.

The window protective layer WPL may protect components disposed thereunder. The window protective layer WPL may include a protective film having an elastic modulus of about 15 GPa or less at room temperature. For example, the window protective layer WPL may include polyethylene terephthalate (PET). The thickness of the window protective layer WPL may be about 40 μm to about 150 μm, but the thickness of the window protective layer WPL is not limited thereto. In an embodiment, the window protective layer WPL may have a multilayer structure. For example, the window protective layer WPL may include a plurality of polymer resin films bonded through a bonding agent or an adhesive. For example, the window protective layer WPL may include a first protective layer, a second protective layer, and a protective adhesive layer bonding the same. In the window protective layer WPL, each thickness of the first protective layer and the second protective layer may be about 30 μm to about 120 μm.

In addition to the protective film, the window protective layer WPL may be additionally provided with a hard coating layer, an anti-fingerprint layer, etc., on the upper surface and/or lower surface of the protective film so as to improve characteristics such as chemical resistance and/or abrasion resistance. The hard coating layer may be formed from a hard coating composition including at least one of an organic composition, an inorganic composition, or an organic/inorganic composite composition. For example, the hard coating layer may be formed from a hard coating composition including at least one of an acrylate-based compound, a siloxane compound, or a silsesquioxane compound. In addition, the hard coating layer may further include inorganic particles. The inorganic particles may improve the hardness of the hard coating layer. The inorganic particles may include at least one of $SiO_2$, $TiO_2$, $Al_2O_3$, $ZrO_2$, ZnO, AlN, or $Si_3N_4$. In addition, the inorganic particles may be surface-treated with an organic material such as silane, in order to increase the degree of dispersion in a hard coating composition.

The window base layer WL may be disposed under the window protective layer WPL. The window base layer WL may include an upper surface WL-U and a lower surface WL-L. The window protective layer WPL may be attached to the upper surface WL-U of the window base layer WL via the window adhesive layer WAL.

The window base layer WL may include a folding portion WL-F and non-folding portions WL-NF1 and WL-NF2. The folding portion WL-F may overlap the folding region FA-WP of the window WP. The non-folding portions WL-NF1 and WL-NF2 may overlap a first non-folding region NFA1-WP and a second non-folding region NFA2-WP of the window WP. The non-folding portions WL-NF1 and WL-NF2 may include a first non-folding portion WL-NF1 overlapping the first non-folding region NFA1-WP, and a second non-folding portion WL-NF2 overlapping the second non-folding region NFA2-WP.

The window base layer WL may be optically transparent. The window protective layer WPL and the window base layer WL may be bonded to each other via the window adhesive layer WAL. The window base layer WL may include an optically transparent insulating material. For example, the window base layer WL may include a glass substrate, or a polymer resin film. The thickness of the window base layer WL may be about 80 μm or less, for example, about 40 μm, but the thickness of the window base layer WL is not limited thereto. For example, the window base layer WL may include a thin glass substrate having a thickness of about 40 μm. The window base layer WL may include an ultrathin glass (UTG).

When the window base layer WL is a polymer resin film, the window base layer WL may include a polyimide film, or a polyethylene terephthalate (PET) film. However, the present disclosure is not limited thereto, the window base layer WL may include a film including at least one of polyamide, polyimide, polyacrylate, polymethylmethacrylate (PMMA), polycarbonate (PC), polyethylenenaphthalate (PEN), polyvinylidene chloride, polyvinylidene difluoride (PVDF), polystyrene, or ethylene vinylalcohol copolymer.

The window base layer WL may have a multilayer structure, or a single layer structure. For example, the window base layer WL may include a plurality of polymer resin films bonded through an adhesive, or include a glass substrate and a polymer resin film bonded through an adhesive.

The window adhesive layer WAL may have a thickness of about 10 μm to about 30 μm. When the thickness of the window adhesive layer WAL is less than about 10 μm, an adhesive force enough to adhere the window base layer WL and the window protective layer WPL is not ensured, and, in a folding operation, the window base layer WL and the window protective layer WPL may contact each other thereby causing damage (e.g., damage to the window base layer WL and/or the window protective layer WPL) due to friction. When the thickness of the window adhesive layer WAL is greater than about 30 μm, the folding characteristics of the display device DD may deteriorate.

The window adhesive layer WAL may include a polymer resin. The window adhesive layer WAL may be an adhesive layer including, for example, at least one of an acrylic resin, a silicone-based resin, a urethane-based resin, or an epoxy-based resin.

The window adhesive layer WAL may include a UV curable adhesive. The window adhesive layer WAL may be an adhesive layer formed by being polymerized and cured through at least one reaction of a radical polymerization reaction or a cationic polymerization reaction.

In addition, the window adhesive layer WAL may be formed from an adhesive composition including a radically polymerizable compound including a radical polymerization reactant. For example, the radically polymerizable compound may be an acrylic compound, specifically an acrylate compound, or a methacrylate compound.

The adhesive composition that forms the window adhesive layer WAL may include a photoinitiator, etc. In addition to the initiator, the adhesive composition may further include any suitable additive such as a photosensitizer, a silane coupling agent, a plasticizer, and/or an antifoaming agent.

Figure 5:
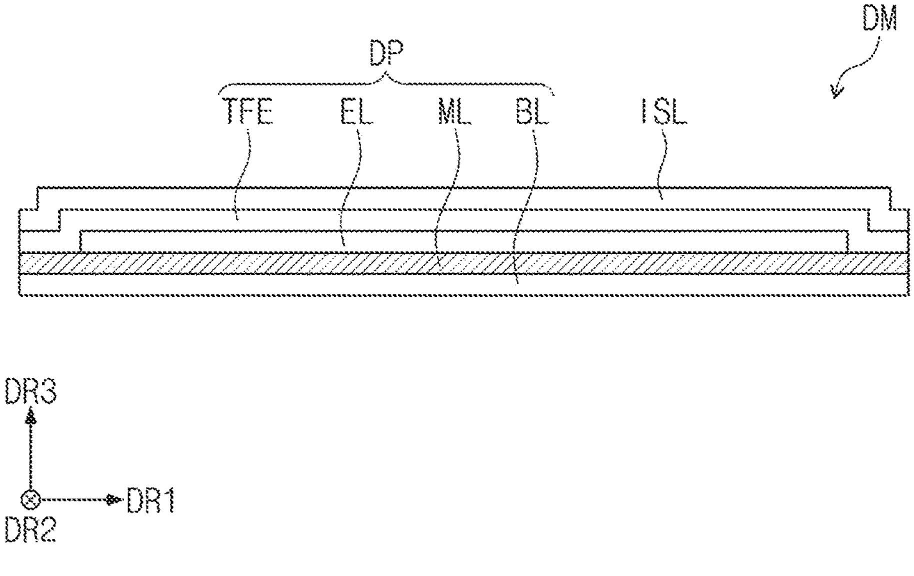
FIG. 5 is a schematic cross-sectional view of a display module according to an embodiment of the present disclosure.

FIG. 5 is a schematic cross-sectional view of a display module according to an embodiment of the present disclosure.

Referring to FIG. 5, the display module DM may include a display panel DP and an input sensing layer ISL.

The display panel DP according to an embodiment of the present disclosure may be a light-emitting display panel, but the present disclosure is not limited thereto. For example, the display panel DP may be an organic light-emitting display panel, or a quantum dot light-emitting display panel. The light-emitting layer of the organic light-emitting display panel may include an organic light-emitting material. The light-emitting layer of the quantum dot light-emitting display panel may include a quantum dot, a quantum rod, etc. Hereinafter, the display panel DP will be described as an organic light-emitting display panel.

The display panel DP may include a base layer BL, a circuit layer ML, a light-emitting element layer EL, and a thin film sealing layer TFE.

The base layer BL may include a flexible material, and for example, the base layer BL may be a plastic substrate. The plastic substrate may include at least one of an acrylic resin, a methacrylic resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin. For example, the base layer BL may include a single-layer polyimide resin. However, the present disclosure is not limited thereto, and the base layer BL may be a stacked structure including a plurality of insulating layers.

The circuit layer ML may be disposed on the base layer BL. The circuit layer ML may include a plurality of insulating layers, a plurality of conductive layers, and a semiconductor layer.

The light-emitting element layer EL may be disposed on the circuit layer ML. The light-emitting element layer EL may include a display element, for example, an organic light-emitting diode.

The thin film sealing layer TFE seals the light-emitting element layer EL. The thin film sealing layer TFE may include a plurality of inorganic layers, and at least one organic layer disposed therebetween.

The input sensing layer ISL may be disposed directly on the thin film sealing layer TFE. That is, the input sensing layer ISL may be formed on the thin film sealing layer TFE through a continuous process. However, the present disclosure is not limited thereto, and the input sensing layer ISL may be formed through a separate process and then bonded to the display panel DP via an adhesive Hereinafter, a window manufacturing method and a window manufacturing apparatus which are applied to a display device according to an embodiment of the present disclosure will be described.

A window manufacturing apparatus according to an embodiment includes a transporting table on which a target substrate is mounted, a suctioning table by which the target substrate is suctioned, and an attachment device which attaches a protective film to the target substrate.

Figure 6A:
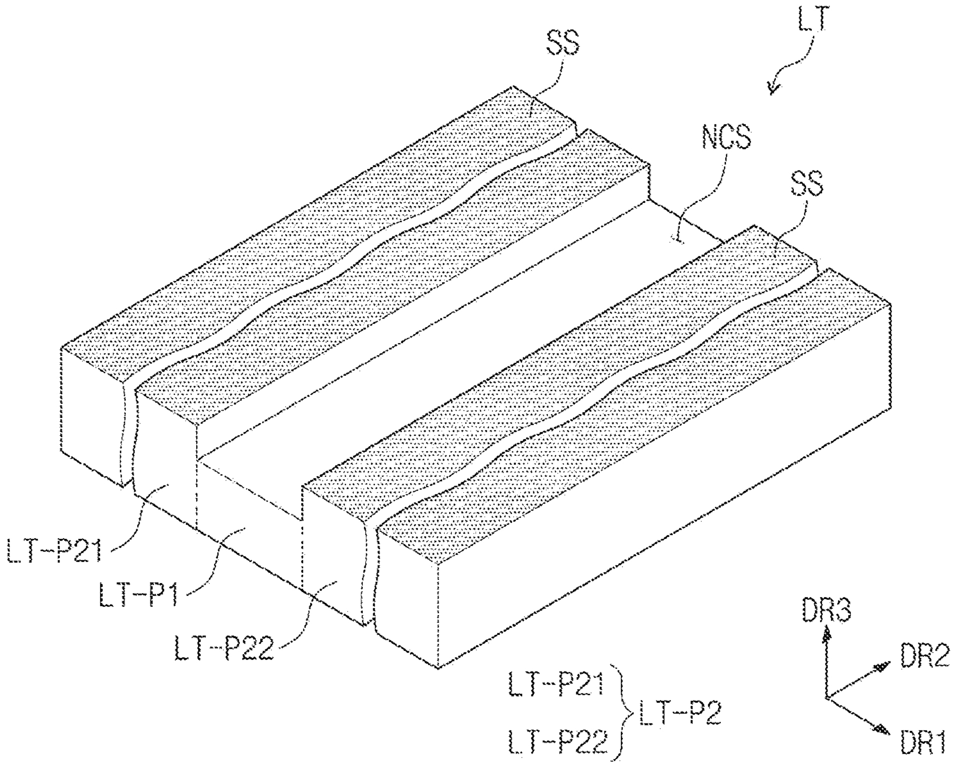
FIG. 6A is a perspective view of a transporting table in a window manufacturing apparatus according to an embodiment of the present disclosure.
Figure 6B:
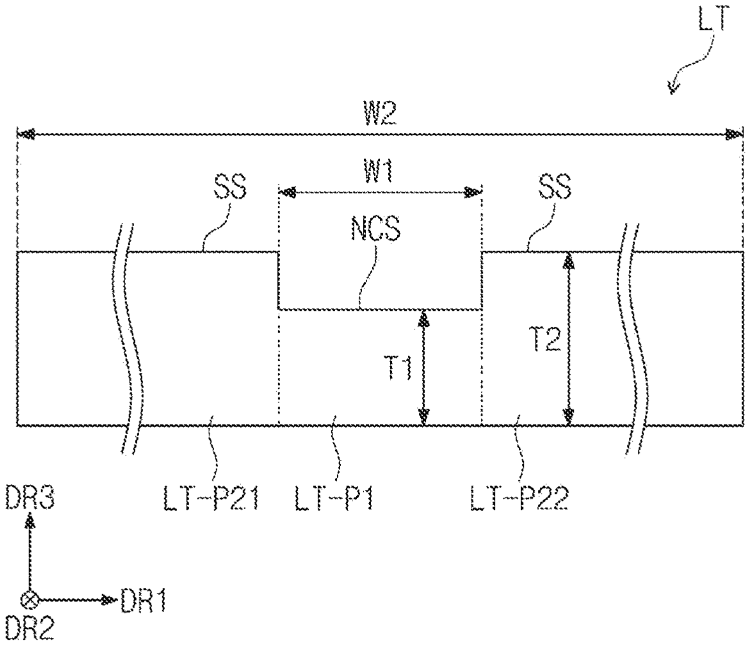
FIG. 6B is a cross-sectional view of a transporting table in a window manufacturing apparatus according to an embodiment of the present disclosure.

FIG. 6A is a perspective view of a partial configuration of a window manufacturing apparatus according to an embodiment of the present disclosure. FIG. 6B is a cross-sectional view of a partial configuration of a window manufacturing apparatus according to an embodiment of the present disclosure. FIGS. 6A and 6B illustrate a transporting table LT of a window manufacturing apparatus according to an embodiment of the present disclosure.

Referring to FIGS. 6A and 6B, a window manufacturing apparatus according to an embodiment includes the transporting table LT on which the target substrate is mounted. The target substrate may be the window base layer WL (e.g., see FIG. 4) before the window protective layer WPL (e.g., see FIG. 4) is attached.

The transporting table LT includes a first part LT-P1 and a second part LT-P2. The second part LT-P2 includes a first sub part LT-P21 and a second sub part LT-P22.

The first part LT-P1 is thinner than the second part LT-P2. In other word, the width of the first part LT-P1 in the thickness direction, that is, the third direction DR3 is smaller than the width of the second part LT-P2. The first part LT-P1 has a first thickness T1, the second part LT-P2 has a second thickness T2, and the second thickness T2 is greater than the first thickness T1.

When the window base layer WL (e.g., see FIG. 4), which is a target substrate, is mounted on the first part LT-P1, the first part LT-P1 may overlap a folding portion WL-F (e.g., see FIG. 4) of the window base layer WL (e.g., see FIG. 4). The width of the first part LT-P1 in the first direction DR1 may be determined by the width of the folding portion WL-F (e.g., see FIG. 4). In an embodiment, a first width W1 of the first part LT-P1 may be about 1% to about 20% of a second width W2, which is the entire width of the transporting table LT. The first width W1 may be, for example, about 2 mm to about 15 mm. However, the present disclosure is not limited thereto.

A mounting surface SS, on which the target substrate is mounted, is defined on the transporting table LT. The mounting surface SS may be substantially the upper surface of the second part LT-P2. The first thickness T1 of the first part LT-P1 may be smaller than the second thickness T2 of the second part LT-P2. Thus, when the target substrate is mounted on the upper surface of the first part LT-P1, the upper surface of the first part LT-P1 may be a non-contact surface NCS which is not in contact with the target substrate. When the target substrate is mounted on the transporting table LT, the target substrate may contact the second part LT-P2, and may not contact the first part LT-P1. For example, a gap or a space may be defined between the target substrate and the upper surface of the first part LT-P1.

The surface roughness of the mounting surface SS may be low. In an embodiment, the surface roughness of the mounting surface SS may be about 10 μm to about 50 μm. The mounting surface SS may be anodized so as to lower the surface roughness thereof. In addition, the mounting surface SS may be surface-polished after being subjected to an anodizing process. Because the surface roughness of the mounting surface SS is low, it is possible to prevent or reduce the occurrence of damage to the surface of the target substrate mounted on the transporting table LT.

In an embodiment, the transporting table LT may include a suctioning device for fixing the mounted target substrate. For example, a plurality of suctioning ports may be defined on the transporting table LT. The plurality of suctioning ports defined on the transporting table LT may be defined on the second part LT-P2 including the mounting surface SS. The suctioning port may not be defined on the first part LT-P1.

Figure 7A:
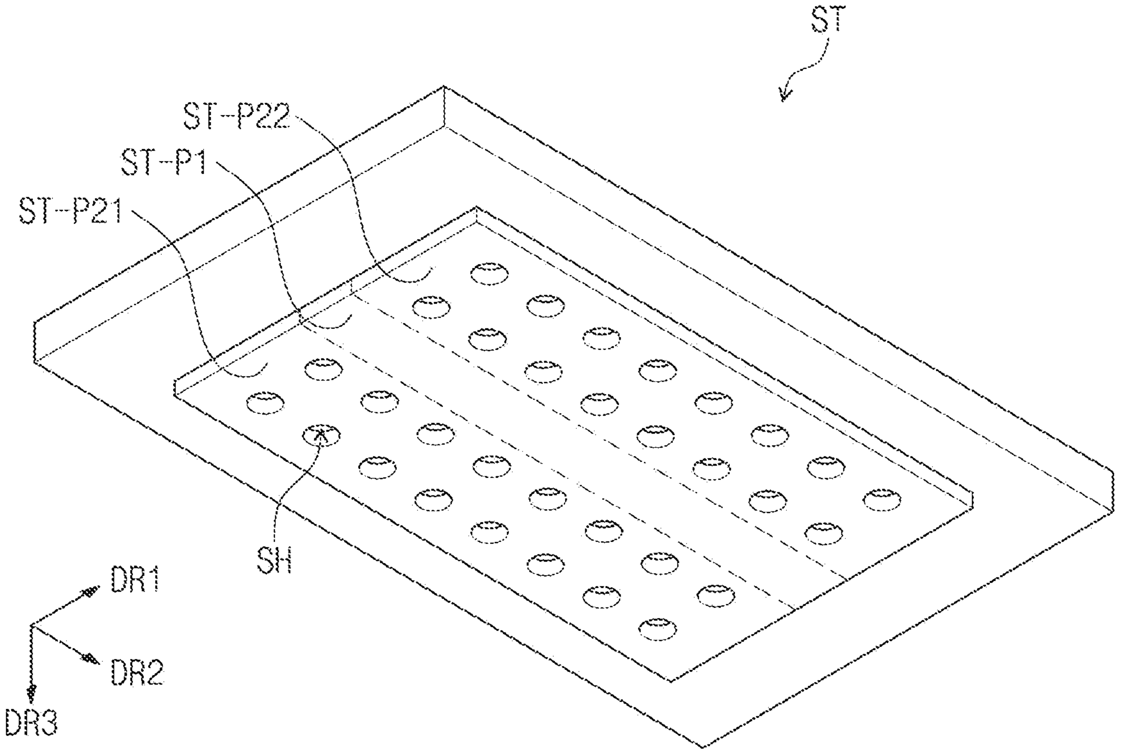
FIG. 7A is a perspective view of a suctioning table in a window manufacturing apparatus according to an embodiment of the present disclosure.
Figure 7B:
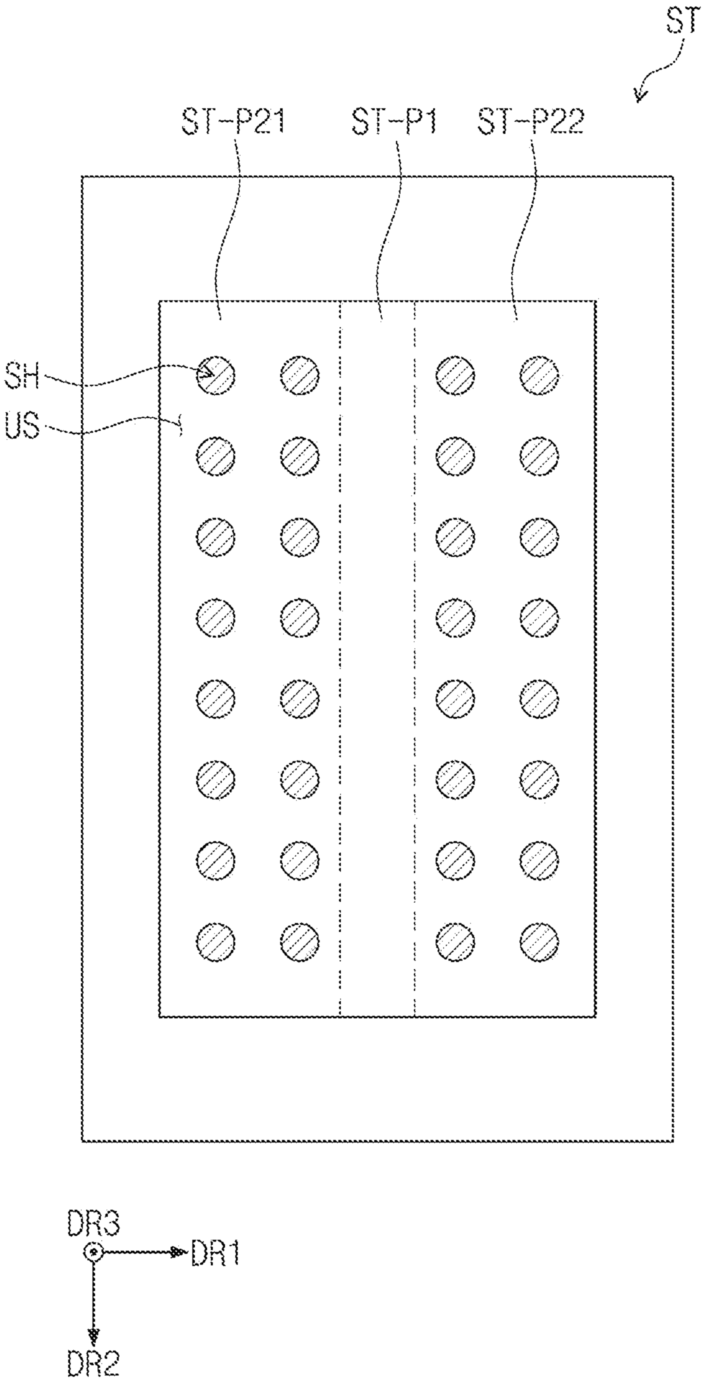
FIG. 7B is a cross-sectional view of a suctioning table in a window manufacturing apparatus according to an embodiment of the present disclosure.

FIG. 7A is a perspective view of a partial configuration of a window manufacturing apparatus according to an embodiment of the present disclosure. FIG. 7B is a cross-sectional view of a partial configuration of a window manufacturing apparatus according to an embodiment of the present disclosure. FIGS. 7A and 7B illustrate a suctioning table ST of a window manufacturing apparatus according to an embodiment of the present disclosure.

Referring to FIGS. 7A and 7B, a window manufacturing apparatus according to an embodiment includes the suctioning table ST to which the target substrate is suctioned. The target substrate may be a window base layer WL (e.g., see FIG. 4) before a window protective layer WPL (e.g., see FIG. 4) is attached thereto.

The suctioning table ST includes a first suctioning part ST-P1 and second suctioning parts ST-P21 and ST-P22. The second suctioning parts ST-P21 and ST-P22 may include a first sub suctioning part ST-P21 and a second sub suctioning part ST-P22.

A plurality of suctioning ports SH for suctioning the target substrate may be defined on the suctioning table ST. The target substrate may be suctioned to the suctioning table ST by the operation of the plurality of suctioning ports SH The plurality of suctioning ports SH may not be defined on the first suctioning part ST-P1, and may be defined only on the second suctioning parts ST-P21 and ST-P22. FIGS. 7A and 7B illustrate the total 16 suctioning ports arranged in eight rows and two columns in each of the first sub suctioning part ST-P21 and the second sub suctioning part ST-P22. However, the present disclosure is not limited thereto, and the number and the arrangement of the suctioning ports SH may be modified in a suitable manner as one of ordinary skill in the art would appreciate.

Referring FIGS. 6A, 6B, 7A, and 7B, the suctioning table ST may be configured to suction the target substrate disposed on the transporting table LT, and allow a subsequent process to be performed. In a state in which the target substrate disposed on the transporting table LT is suctioned by the suctioning table ST, the first suctioning part ST-P1 of the suctioning table ST may overlap (e.g., overlap in a thickness direction of the transporting table LT) the first part LT-P1 of the transporting table LT, and the second suctioning parts ST-P21 and ST-P22 of the suctioning table ST may overlap (e.g., overlap in the thickness direction of the transporting table LT) the second part LT-P2 of the transporting table LT. Accordingly, in a state in which the target substrate disposed on the transporting table LT is suctioned by the suctioning table ST, the plurality of suctioning ports SH, which may be defined only on the second suctioning parts ST-P21 and ST-P22 but not on the first suctioning part ST-P1, may overlap only the second part LT-P2 of the transporting table LT, and may not overlap the first part LT-P1.

Referring back to FIGS. 7A and 7B, a suctioning surface US, on which the target substrate is suctioned such that the target substrate is in contact with the suctioning surface US, may be defined on the suctioning table ST. The suctioning surface US may be substantially the lower surface of the suctioning table ST. The suctioning surface US may be the lower surface of each of the first suctioning part ST-P1 and the second suctioning parts ST-P21 and ST-P22.

The surface roughness of the suctioning surface US may be low. In an embodiment, the suctioning surface US may have a surface roughness of about 10 μm to about 50 μm. The suctioning surface US may be anodized so as to lower the surface roughness thereof. In addition, the suctioning surface US may be surface-polished after being subjected to an anodizing process. Because the surface roughness of the suctioning surface US is low, it is possible to prevent or reduce the occurrence of damage to the surface of the suctioned target substrate.

FIGS. 8A-8F are cross-sectional views sequentially illustrating a window manufacturing method according to an embodiment of the present disclosure. FIGS. 8A-8F sequentially illustrate a process for attaching a window protective layer WPL to a window base layer WL, and a process for measuring the flexural strength of the manufactured window, by using a window manufacturing apparatus according to an embodiment of the present disclosure.

Figure 8A:
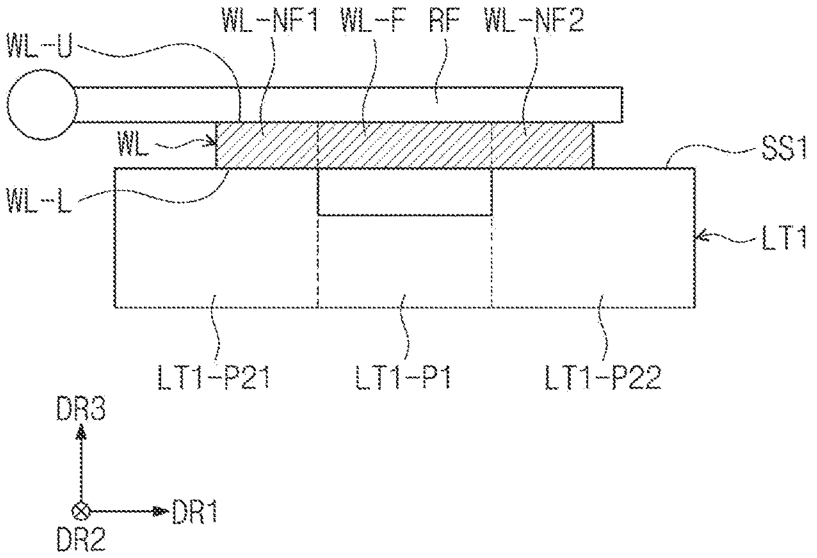
FIGS. 8A-8F are cross-sectional views sequentially illustrating a window manufacturing method according to an embodiment of the present disclosure.
Figure 8B:
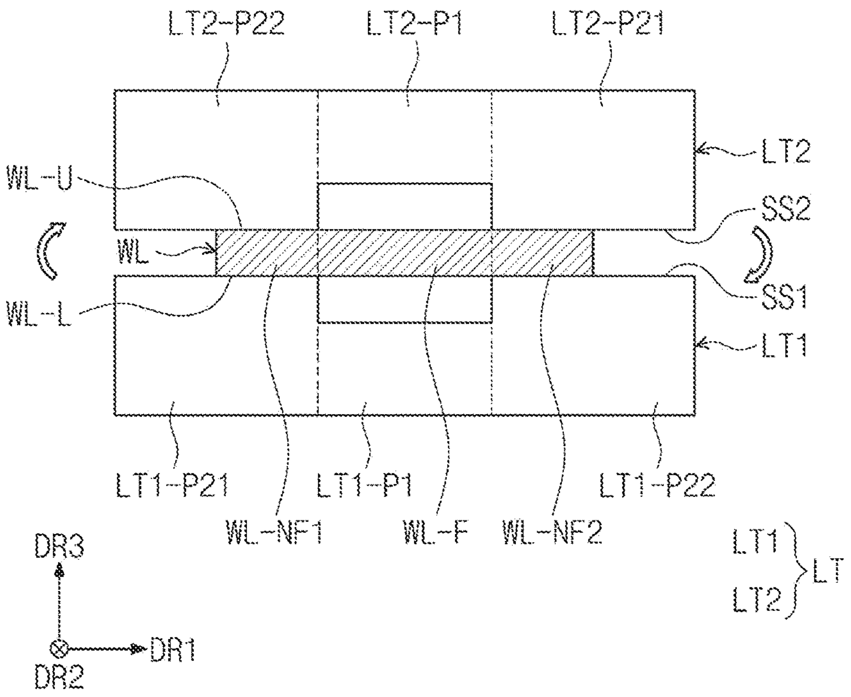

Referring to FIGS. 8A and 8B, the window manufacturing method according to an embodiment includes mounting a target substrate on a transporting table LT. The target substrate may be the window base layer WL. As described above, the window base layer WL may include a folding portion WL-F and non-folding portions WL-NF1 and WL-NF2.

The transporting table LT may include a first transporting table LT1 and a second transporting table LT2. The window base layer WL, which is the target substrate, may be mounted on the first transporting table LT1, and then may be transported to the second transporting table LT2. In the transporting, the lower surface WL-L of the window base layer WL may be mounted to be in contact with the first transporting table LT1, and the upper surface WL-U of the window base layer WL may be mounted to be in contact with the second transporting table LT2.

The first transporting table LT1 may include an 11th part LT1-P1, and 21st parts LT1-P21 and LT1-P22, and the second transporting table LT2 may include a 12th part LT2-P1, and 22nd parts LT2-P21 and LT2-P22. The 11th part LT1-P1 may be thinner than the 21st parts LT1-P21 and LT2-P22, and the 12th part LT2-P1 may be thinner than the 22nd parts LT2-P21 and LT2-P22. Accordingly, a first mounting surface SS1 of the first transporting table LT1 may be defined as the upper surface of each of the 21st parts LT1-P21 and LT1-P22, a second mounting surface SS2 of the second transporting table LT2 may be defined as the upper surface of each of the 22nd parts LT2-P21 and LT2-P22. The window base layer WL, which is the target substrate, may contact the first mounting surface SS1 and the second mounting surface SS2. In an embodiment, the first mounting surface SS1 and the second mounting surface SS2 may contact opposite sides of the window base layer WL.

For example, the lower surface WL-L of the window base layer WL may be mounted to be in contact with the first mounting surface SS1, and the upper surface WL-U of the window base layer WL may be mounted to be in contact with the second mounting surface SS2.

The window base layer WL may not contact the upper surfaces of the 11th part LT1-P1 and the 12th part LT2-P1. In an embodiment, a gap or a space may be defined between the upper surface of the 11th part LT1-P1 and the window base layer WL, and a gap or a space may be defined between the upper surface of the 12th part LT2-P1 and the window base layer WL. The folding portion WL-F of the window base layer WL may overlap the 11th part LT1-P1 and the 12th part LT2-P1 in a plan view, and thus, the folding portion WL-F may not contact the first transporting table LT1 and the second transporting table LT2.

The window manufacturing apparatus according to an embodiment may further include a transporting device RF which transports the window base layer WL to the transporting table LT. The transporting device RF may suction and transport the window base layer WL to the first transporting table LT1. The transporting device RF may be, for example, an articulated robot device. The window base layer WL may be moved to the first transporting table LT1 by the transporting device RF, and may then be moved from the first transporting table LT1 to the second transporting table LT2. In the moving of the window base layer WL from the first transporting table LT1 to the second transporting table LT2, the window base layer WL may contact the first transporting table LT1 and the second transporting table LT2. The window base layer WL may rotate 180° in a state in which the window base layer WL contacts the respective mounting surfaces SS1 and SS2 of the first transporting table LT1, and the second transporting table LT2.

Figure 8C:
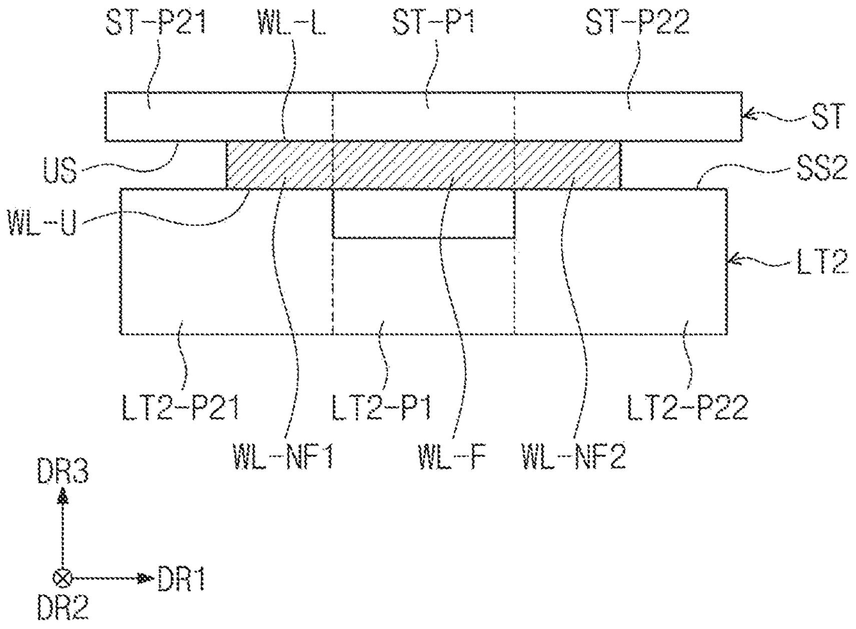
Figure 8D:
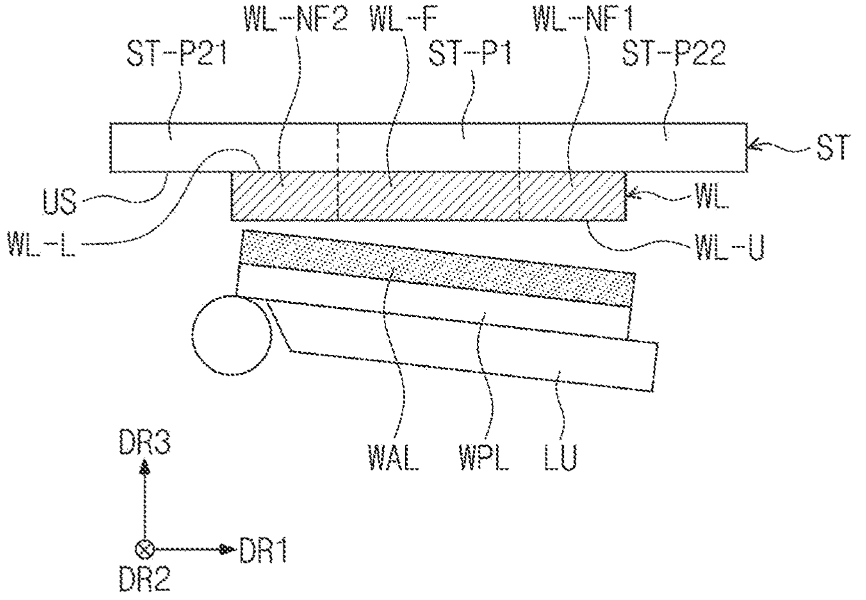

Referring to FIGS. 8B, 8C, and 8D, the window manufacturing method according to an embodiment includes suctioning the target substrate mounted on the transporting table LT through the suctioning table ST, and moving the target substrate. In other words, the target substrate mounted on the transporting table LT may be suctioned by the suctioning table ST and moved with the target substrate between the suctioning table ST and the transporting table LT. The window base layer WL, which is the target substrate, may be suctioned by a plurality of suctioning ports SH (e.g., see FIG. 7A) defined on the suctioning table ST.

In the suctioning of the window base layer WL mounted on the transporting table LT by the suctioning table ST, the window base layer WL may contact the lower surface of the suctioning table ST. In a state in which the window base layer WL is suctioned to the suctioning table ST, the lower surface WL-L of the window base layer WL may contact the suctioning surface US (e.g., see FIG. 7B) of the suctioning table ST.

In the suctioning, a first suctioning part ST-P1 of the suctioning table ST may overlap the 12th part LT2-P1 of the second transporting table LT2, and second suctioning parts ST-P21 and ST-P22 of the suctioning table ST may overlap the 22nd part LT2-P2 of the second transporting table LT2. Accordingly, in a state in which the window base layer WL disposed on the second transporting table LT2 is suctioned by the suctioning table ST, the plurality of suctioning ports SH, which are defined only on the second suctioning part ST-P21 and ST-P22, but not on the first suctioning part ST-P1, may overlap only the 22nd part LT2-P2 of the second transporting table LT2, and may not overlap the 12th part LT2-P1.

In the suctioning, the first suctioning part ST-P1 may overlap the folding portion WL-F of the window base layer WL, and the second suctioning parts ST-P21 and ST-P22 may overlap the non-folding portion WL-NF1 and WL-NF2 of the window base layer WL. Accordingly, in a state in which the window base layer WL is suctioned by the suctioning table ST, the plurality of suctioning ports SH, which are defined only on the second suctioning parts ST-P21 and ST-P22 but not on the first suctioning part ST-P1, may overlap only the non-folding portions WL-NF1 and WL-NF2, and may not overlap the folding portion WL-F.

Figure 8E:
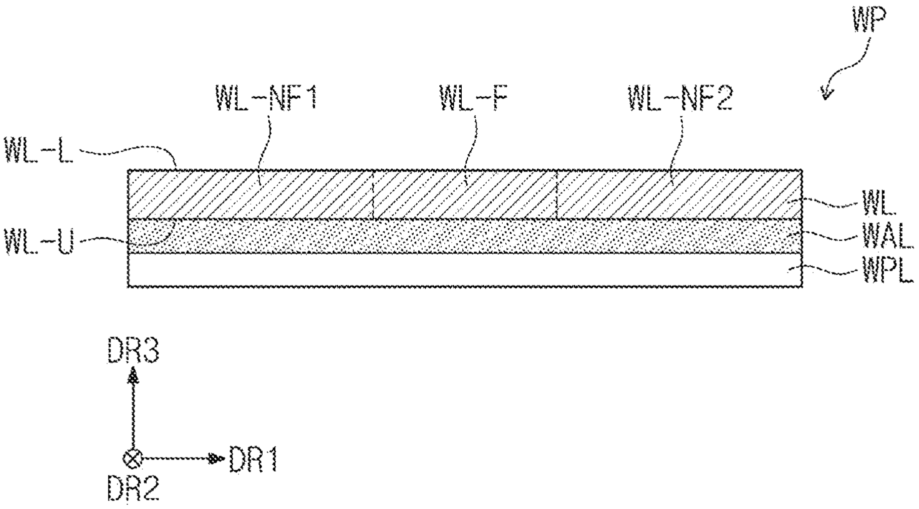

Referring to FIGS. 80, 8D, and 8E, the window manufacturing method according to an embodiment includes attaching a protective film to the target substrate suctioned by the suctioning table ST.

While the window base layer WL as the target substrate is suctioned to the suctioning table ST, the window protective layer (or the protective film) WPL may be attached to the upper surface WL-U of the window base layer WL by an attaching device (or an attachment device) LU. The attaching device LU may be, for example, a lamination device. The window protective layer WPL may be attached to the window base layer WL through the window adhesive layer WAL.

Figure 8F:
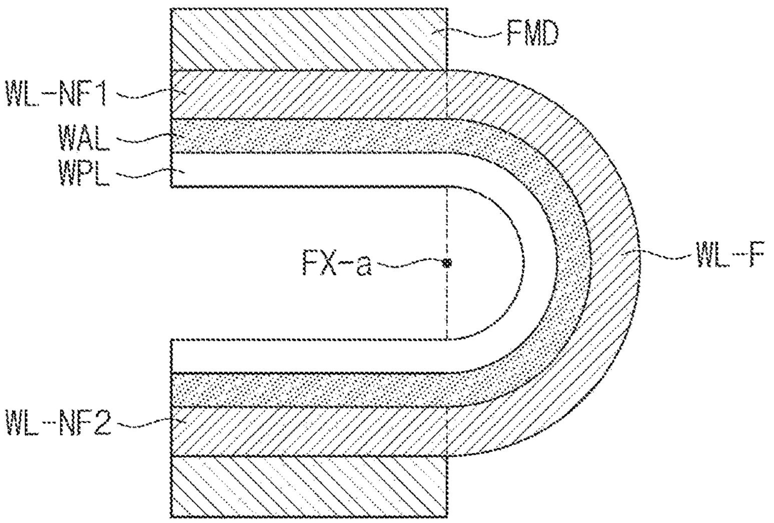

Referring to FIGS. 8E and 8F, the window manufacturing apparatus according to an embodiment may further include a flexure evaluating device FMD which measures the flexural strength of a window WP with the window protective layer WPL attached thereto. The flexure evaluating device FMD may fold the window WP once or repeatedly so as to have a curvature (e.g., predetermined curvature) around an evaluation folding axis FX-a, after the window protective layer WPL is attached to the window base layer WL. After the flexural strength of the window WP is measured with the flexure evaluating device FMD, the window WP in which the window protective layer WPL is attached to the window base layer WL may be applied to the display device DD (e.g., see FIG. 3A), and may be coupled to the display module DM and/or other components. The window manufacturing method according to an embodiment may further include performing a visual inspection to check an attached condition of which the window protective layer WPL, before measuring the flexural strength of the window WP with the flexure evaluating device FMD.

In the transporting table included in the window manufacturing apparatus according to an embodiment, a portion overlapping the folding portion of the window base layer, which is the target substrate, is set to be thinner than a portion overlapping the non-folding portion thereof, so that a portion overlapping the folding region does not contact the target substrate. More specifically, the first part of the transporting table is set to be thinner than the second part, and therefore, in a state in which the window base layer is mounted on the transporting table, the first part may be disposed to not be in contact with the folding portion of the window base layer, and the second part may be disposed to support the non-folding portion of the window base layer. Accordingly, damage to the folding portion occurring when the window base layer is mounted on the transporting table and is moved may be prevented or reduced, thereby improving the folding reliability and durability of a window manufactured by the window manufacturing apparatus.

In addition, the suctioning table included in the window manufacturing apparatus according to an embodiment does not form suctioning ports on a portion overlapping the folding portion of the window base layer, thereby preventing or reducing the occurrence of damage to the folding portion which may be caused by the suctioning. More specifically, because the suctioning ports are not disposed on the first suctioning part of the suctioning table, and are disposed only on the second suctioning part, damage to the folding portion may be prevented or reduced without degradation in suctioning performance of the suctioning table, thereby improving the folding reliability and durability of a window manufactured by the window manufacturing apparatus.

In a related art window manufacturing apparatus, when the target substrate is transported, a method for providing the mounted surface with porous film, etc., to reduce friction between the target substrate and the transporting table is applied so as to prevent or reduce damage, of the target substrate, caused by the surface of the transporting table. However, foreign materials provided from the porous film remains, to cause a damage to the folding portion of the window by the foreign materials in a subsequent process such as flexure evaluation. In the window manufacturing apparatus according to an embodiment of the present disclosure, the first part of the transporting table does not contact the window base layer as the target substrate, and the suctioning ports are not disposed on the first suctioning part of the suctioning table, so that damage of the window base layer transported and suctioned by the window manufacturing apparatus may be prevented or reduced without providing a porous film, etc. Accordingly, the folding reliability and durability of the window manufactured by the window manufacturing apparatus may be improved, and the reliability of the manufactured display device including the same may be also improved.

According to an embodiment of the present disclosure, a protective film may be attached to a window which includes a thin-film base layer and is applied to a foldable display device, without damage to a window folding portion, thereby improving the folding reliability and durability of the window.

In the above, description has been made with reference to embodiments of the present disclosure, but those skilled in the art or those of ordinary skill in the relevant technical field may understand that various modifications and changes may be made to the present disclosure without departing from the spirit and scope of the present disclosure. Therefore, the scope of the present disclosure is not limited to the contents described in the detailed description of the specification, and may be determined by the claims, and equivalents thereof.

What is claimed is:

1. A window manufacturing method comprising:

mounting a target substrate on a transporting table comprising a first portion and a second portion on opposite sides of the first portion and having a greater thickness than the first portion, the first and second portion defining a groove in the transporting table;

suctioning the target substrate mounted on the transporting table through a plurality of suctioning ports of a suctioning table; and attaching a protective film to the target substrate suctioned to the suctioning table, wherein, in the suctioning of the target substrate to the suctioning table, the plurality of suctioning ports overlap the second portion of the transporting table and do not overlap the first portion of the transporting table in a plan view.

2. The window manufacturing method of claim 1, wherein the target substrate comprises a folding portion and a non-folding portion adjacent to the folding portion, and, in the mounting of the target substrate on the transporting table, the folding portion overlaps the first portion and the non-folding portion overlaps the second portion.

3. The window manufacturing method of claim 2, wherein, in the suctioning of the target substrate to the suctioning table, the plurality of suctioning ports overlap the non-folding portion.

4. The window manufacturing method of claim 1, wherein, in the mounting of the target substrate on the transporting table, the target substrate contacts an upper surface of the second portion and does not contact an upper surface of the first portion.

5. The window manufacturing method of claim 1, wherein the target substrate comprises glass.

6. The window manufacturing method of claim 1, wherein the protective film comprises polyethylene terephthalate (PET).

7. A manufacturing method of a display device, the method comprising:

preparing a window including a first non-folding region, a folding region, and a second non-folding region which are sequentially arranged in a first direction;

preparing a display module; and combining the window and the display module, wherein the preparing of the window comprises:

mounting a target substrate on a transporting table comprising a first portion and a second portion on opposite sides of the first portion and having a greater thickness than the first portion, the first and second portion defining a groove in the transporting table;

suctioning the target substrate mounted on the transporting table through a plurality of suctioning ports of a suctioning table; and attaching a protective film to the target substrate suctioned to the suctioning table, and wherein, in the suctioning of the target substrate to the suctioning table, the plurality of suctioning ports overlap the second portion of the transporting table and do not overlap the first portion of the transporting table in a plan view.

8. The method of claim 7, wherein the target substrate comprises a folding portion overlapping the folding region, and a non-folding portion overlapping the first non-folding region and the second non-folding region, and, in the mounting of the target substrate on the transporting table, the folding portion overlaps the first portion and the non-folding portion overlaps the second portion.

9. The method of claim 8, wherein, in the suctioning of the target substrate to the suctioning table, the plurality of suctioning ports overlap the non-folding portion.

* * * * *